United States Patent [19]

Soudijn et al.

[11] 3,843,634

[45] Oct. 22, 1974

[54] BENZIMIDAZOLINONE DERIVATIVES

[75] Inventors: Willem Soudijn, Turnhout; Ineke Van Wijngaarden, Beerse; Paul Adriaan Jan Janssen, Vosselaar, all of Belgium

[73] Assignee: Janssen Pharmaceutical N.V., Beerse, Belgium

[22] Filed: Feb. 20, 1973

[21] Appl. No.: 333,858

[52] U.S. Cl............................ 260/240 TC, 424/267
[51] Int. Cl............................................. C07d 49/38
[58] Field of Search ..... 260/240 TC, 293.6, 293.62, 260/293.66

[56] References Cited
UNITED STATES PATENTS 3,074,953  1/1963  Davis et al. ...................... 260/294.3
3,345,364  10/1967  Janssen ............................... 260/240
3,766,174  10/1973  Nakanishi et al. ............ 260/240 TC

*Primary Examiner*—G. Thomas Todd
*Attorney, Agent, or Firm*—Salvatore R. Conte

[57]         ABSTRACT

The compounds, 1-{1-[3-(10,11-dihydro-5H-diberzo-[a,d]cyclohepten-5-ylidene)propyl]-4-piperidy}-2-benzimidazolinone and 1-{1-[3-(5H-dibenzo[a,d]cyclohepten-5-ylidene)propyl]-4-piperidyl}-2-benzimidazolinone, useful as neuroleptic agents.

3 Claims, No Drawings

BENZIMIDAZOLINONE DERIVATIVES

DESCRIPTION OF THE INVENTION

This invention relates to novel benzimidazolinone derivatives which may be structurally represented by the formula:

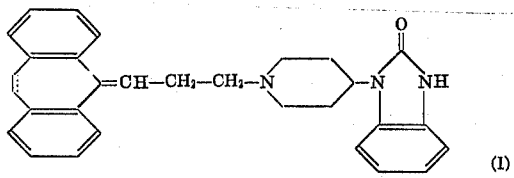

wherein the dotted line represents an optional double bond. Without such double bond, the benzimidazolinone derivative is 1-{1-[3-(10,11-dihydro-5H-dibenzo[a,d]cyclohepten-5-ylidene)-propyl]-4-piperidyl}-2-benzimidazolinone; and with the double bond, the benzimidazolinone derivative is 1-{--3-(5H-dibenzo[a,d]cyclohepten-5-ylidene)propyl]-4-piperidyl}-2-benzimidazolinone.

The subject compounds (I) are prepared by reacting an appropriate dibenzo[a,d]cycloheptylidene of formula (II), where X is a reactive ester of the corresponding alcohol, e.g., chloro, bromo, mesylate, tosylate and the like, preferably chloro or bromo, with 1-(4-piperidyl)-2-benzimidazolinone (III). This condensation reaction is conveniently conducted in an inert organic solvent such as, for example, an aromatic hydrocarbon e.g., benzene, toluene, xylene and the like; a lower alkanol, e.g., methanol, ethanol, n-butanol and the like; a ketone, e.g., 4-methyl-2-pentanone, butanone, and the like; an ether, e.g., dioxane, diethyl ether and the like; dimethylformamide (DMF); nitrobenzene; and the like. The addition of an acid acceptor, i.e., an appropriate base such as, for example, an alkali metal carbonate or bicarbonate, or an organic tertiary amine, such as, for example, a trialkylamine, e.g., triethylamine, tributylamine and the like, or a heterocyclic amine, e.g., pyridine, quinoline and the like, may be utilized to bind the acid that is liberated during the course of the reaction. The amount of acid acceptor that may be employed is not critical, but, for optimum conditions, the theoretical number of moles of liberated acid can easily be calculated from the quantities of reactants employed and, thus, the corresponding amount of acid acceptor that need be employed can readily be determined. The presence of catalytic amounts of potassium iodide is also desirable when X is halo. Elevated temperatures may be employed to enhance the rate of reaction.

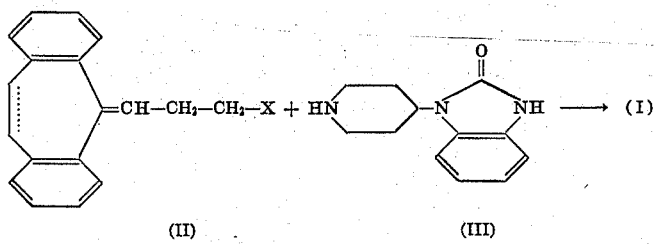

The compounds of formula (I) have been found to possess central nervous system (CNS) depressant activity similar to the neuroleptic activity of butyrophenones, for example, haloperidol (see U.S. Pat. No. 3,438,991), and of certain benzimidazolinones, e.g. pimozide (see U.S. Pat. No. 3,196,157) and of the 4-aryl-4-hydroxypiperidines in U.S. Pat. No. 3,575,990. Although the subject compounds are qualitatively similar in neuroleptic activity to haloperidol, they differ significantly from the latter in their longer duration of action, similar to said pimozide and to said 4-aryl-4-hydroxypiperidines.

Neuroleptic drugs are known to block apomorphine-induced vomiting in dogs. In the anti-apomorphine test [see "Method 1" in Janssen, P.A.J., et al., Arzneim.-Forsch., 15, 1,196 (1965)], the compound to be tested is given orally followed at different time intervals thereafter by the standard dose of apomorphine (0.31 mg/kg s.c.) which will induce vomiting in untreated dogs. Anti-apomorphine activity is demonstrated with the compounds (I) at oral dose levels as low as 0.005 mg/kg and at $ED_{50}$ values of about 0.02-1.0 mg/kg orally. The $ED_{50}$ value (in mg/kg) is the oral dose level of the tested compound protecting 50% of the animals from emesis. In Table 1, the $ED_{50}$ values and the duration of activity of the compounds described herein are given.

Another characterization of neuroleptic drugs is their ability to antagonize amphetamine-induced CNS-stimulation. In the amphetamine antagonism test, male Wistar rats are pretreated with an oral dose of the compound to be tested and challenged one hour thereafter with a standard dose of amphetamine (5mg/kg i.v.). In untreated animals, the standard dose of amphetamine will induce typical CNS-stimulation, e.g., agitation and stereotyped chewing. These phenomena are antagonized by neuroleptic drugs. The data in Table 1 shows the oral dose levels at which the subject compounds protect the rats against the amphetamine-induced agitation and chewing.

TABLE 1

| Compound of Example | Anti-apomorphine test in dogs (oral) | | Amphetamine antagonism in rats (oral) |
|---|---|---|---|
| | $ED_{50}$ | Duration | $ED_{50}$ |
| I | 0.46 mg/kg | 20 hours | 2.5 mg/kg |
| II | 0.40 mg/kg | 35 hours | 2.5 mg/kg |

The following examples are intended to illustrate, but not to limit, the scope of the present invention. Unless otherwise stated, all parts are by weight.

EXAMPLE I

A mixture of 1.63 parts of 5-(3-bromopropylidene)-10,11-dihydro-5H-dibenzo[a,d]cycloheptane, 1.09 parts of 1-(4-piperidyl)-2-benzimidazolinone, 0.8 parts of anhydrous sodium carbonate and 7.5 parts of dimethylformamide is stirred and heated at 105°C for 3 hours. The reaction mixture is cooled, filtered over hyflo, and upon dilution of the filtrate with water, the product, 1-{1-[3-(10,11-dihydro-5H-dibenzo[a,d]cyclohepten-5-ylidene)propyl]-4-piperidyl}-2-benzimidazolinone, is crystallized. It is filtered off, washed with water and recrystallized from ethyl acetate, yielding 1-{1-[3-(10,11-dihydro-5H-dibenzo[a,d]cyclohepten-5-ylidene)propyl]-4-piperidyl}-2-benzimidazolinone hydrate; mp. 108.5°C.

EXAMPLE II

A mixture of 1.37 parts of 5-(3-bromopropylidene)-5H-dibenzo[a,d]cycloheptene, 0.87 parts of 1-(4-piperidyl)-2-benzimidazolinone, 0.64 parts of sodium carbonate and 5 parts of dimethylformamide is stirred for 3 hr. 30 min. in an oil-bath at 110°C. The reaction mixture is cooled, filtered and the filtrate is diluted with water. The precipitated product is filtered off, washed with water, dried and taken up in chloroform. The chloroform solution is purified by column-chromatography, using a mixture of chloroform and 5percent of methanol. The pure fractions are collected and the solvent is evaporated. The residue is crystallized from ethyl acetate. The product is filtered off freedom recrystallized from ethanol, yielding, after drying in vacuo at 100°C, 1-{1-[3-(5H-dibenzo[a,d]-cyclohepten-5-ylidene)propyl]-4-piperidyl}-2-benzimidazolinone; mp. 217.8°C.

We claim:
1. A benzimidazolinone derivative having the formula:

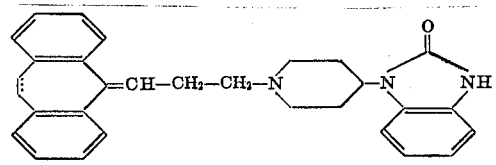

wherein the dotted line represents an optional double bond.

2. 1-{1-[3-(10,11-dihydro-5H-dibenzo[a,d]cyclohepten-5-ylidene)propyl]-4-piperidyl}-2-benzimidazolinone hydrate.

3. 1-{1-[3-(5H-dibenzo[a,d]cyclohepten-5-ylidene)-propyl]-4-piperidyl}-2-benzimidazolinone.

* * * * *

PC-1050
(5/69)

UNITED STATES PATENT OFFICE
CERTIFICATE OF CORRECTION

Patent No. 3,843,634                              Dated  October 22, 1974

Inventor(s)  Willem Soudijn, Ineke Van Wijngaarden, Paul Adriaan Jan Janssen

It is certified that error appears in the above-identified patent and that said Letters Patent are hereby corrected as shown below:

In the Abstract, line 1, "diberzo" should read --- dibenzo ---.

In Column 4, line 2, "freedom" should read --- and ---.

Signed and sealed this 18th day of March 1975.

(SEAL)
Attest:

RUTH C. MASON
Attesting Officer

C. MARSHALL DANN
Commissioner of Patents
and Trademarks